(12) United States Patent
Mizuno et al.

(10) Patent No.: US 7,600,446 B2
(45) Date of Patent: Oct. 13, 2009

(54) GEARSHIFT POSITION DETECTOR FOR A VEHICLE TRANSMISSION

(75) Inventors: Kinya Mizuno, Saitama (JP); Shinichiro Keyaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 592 days.

(21) Appl. No.: 11/227,892

(22) Filed: Sep. 15, 2005

(65) Prior Publication Data

US 2006/0065068 A1    Mar. 30, 2006

(30) Foreign Application Priority Data

Sep. 28, 2004   (JP) .............................. 2004-280860

(51) Int. Cl.
*B60Q 1/00* (2006.01)
(52) U.S. Cl. .................... 74/473.1; 74/337.5; 340/456
(58) Field of Classification Search .............. 73/115.02, 73/115.01, 115.03; 74/473.1, 337.5; 200/61.46, 200/11 TC, 61.88, 11 R, 14, 19.01, 19.18; 324/207.25; 123/195 R, 615; 180/336; 340/456; 190/30 W
See application file for complete search history.

(56) References Cited

U.S. PATENT DOCUMENTS

| | | | | |
|---|---|---|---|---|
| 4,491,031 A | * | 1/1985 | Ooka ........................ | 74/337.5 |
| 5,024,113 A | * | 6/1991 | Ito et al. ..................... | 74/6 |
| 5,713,243 A | * | 2/1998 | Williams et al. ......... | 74/473.21 |
| 6,186,263 B1 | * | 2/2001 | Takano ...................... | 180/336 |
| 6,857,499 B2 | * | 2/2005 | Kawamoto et al. ......... | 180/336 |
| 6,966,237 B2 | * | 11/2005 | Scheib et al. ............ | 74/473.12 |

FOREIGN PATENT DOCUMENTS

| | | | | |
|---|---|---|---|---|
| JP | | 2003208834 A | * | 7/2003 |
| JP | | 2004-203313 | | 7/2004 |
| JP | | 2004205011 A | * | 7/2004 |

* cited by examiner

*Primary Examiner*—Richard W L Ridley
*Assistant Examiner*—Alan B Waits
(74) *Attorney, Agent, or Firm*—Carrier, Blackman & Associates, P.C.; William D. Blackman; Joseph P. Carrier

(57) ABSTRACT

A gearshift position detector, for a transmission component of a powertrain unit including an engine and a transmission, includes first and second actuator arms for cooperatively interacting with neutral and reverse indicator switches. The neutral and reverse indicator switches are mounted to a crankcase or a crankcase cover of the engine. The acutator arms are selectively operable to trip the respective switches, and thereby, to generate signals for alerting a vehicle operator that the transmission is in neutral or reverse. The actuator arms are operatively attached to a shift drum skip-turn-prevention plate which, in turn, is secured to an axial end surface of a shift drum. The indicator switches are, respectively, capable of being energized upon interaction between the corresponding actuator arm and the switch. In this configuration, the main components of the detector are housed within the crankcase, thereby saving space in the vicinity of the engine.

18 Claims, 7 Drawing Sheets

GEARSHIFT POSITION DETECTOR FOR A VEHICLE TRANSMISSION

CROSS-REFERENCE TO RELATED APPLICATIONS

The present invention claims priority under 35 USC 119 based on Japanese patent application No. 2004-280860, filed on Sep. 28, 2004. The subject matter of this priority document is incorporated by reference herein.

BACKGROUND OF THE INVENTION

1. Field of the Invention

The present invention relates to a gearshift position detector for a manual transmission used in motorcycles and other vehicles.

2. Description of the Background Art

Gearshift position detectors are well known, and include one or more detectors for detecting a neutral gear position, a reverse gear position, and/or an engaged gear position. An example of the conventional technology related to the neutral position detector is as follows: A neutral position detector is mounted on the outer wall of a lower crankcase of an engine. A detecting pin, located at the end of the detector, is directed in the direction of the centerline of a shift drum. In addition, a cam face structure portion provided with a cam adapted to detect a neutral position is provided on the outer circumferential surface of the shift drum. The detecting pin is disposed to face the cam face structure portion with a small gap therebetween, or to be in contact with the same with a pressing force. With this configuration, as the shift drum turns, the detection cam of the cam face structure portion presses the detecting pin. Thus, the neutral position is detected at the time of speed-change. This type of structure is disclosed, for example, in FIG. 3 of Japanese Laid-open Patent document No. 2004-203313.

In Japanese Laid-open Patent document No. 2004-203313, the neutral position detector has been provided on the outer circumferential surface of the crankcase, in a radial direction of the shift drum. Therefore, the main body of the detector protrudes externally from the crankcase. This configuration creates difficulties in positioning the engine, and in arranging other components around the engine. In addition, in some cases it is difficult to route wiring in the vicinity of the mounted engine. The present invention eliminates the above problems by creating a compact configuration of components, effectively using the space around the shift drum in the axial direction of the shift drum.

SUMMARY OF THE INVENTION

The present invention improves upon the problems described above. A first aspect of the present invention relates to a gearshift position detector for a vehicular transmission, characterized in that an actuator member (switch plate), adapted to detect a neutral position and a reverse position of a shift drum, is operatively attached to a shift drum skip-turn-prevention plate secured to an end of the shift drum. In addition, a neutral indicator switch and a reverse indicator switch are operatively mounted to a crankcase or a crankcase cover, and these indicator switches become energized upon contact with the actuator member.

According to the first aspect of the invention, since the actuator member or the switch plate is operatively attached to the shift drum skip-turn-prevention plate, the length of time required for attachment of the detector is reduced, attachment accuracy is improved and space-saving is achieved.

A second aspect of the present invention is characterized in that, in the gearshift position detector for a vehicular transmission as recited in the first aspect of the invention, a neutral switch actuator arm and a reverse switch actuator arm of the actuator member are disposed opposite to each other with respect to an axis of the shift drum.

According to the second aspect of the invention, since the neutral switch actuator arm and a reverse switch actuator arm of the actuator member are disposed opposite to each other with respect to an axis of the shift drum, space-saving within and about the crankcase is achieved.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION OF THE INVENTION

Figure 1:
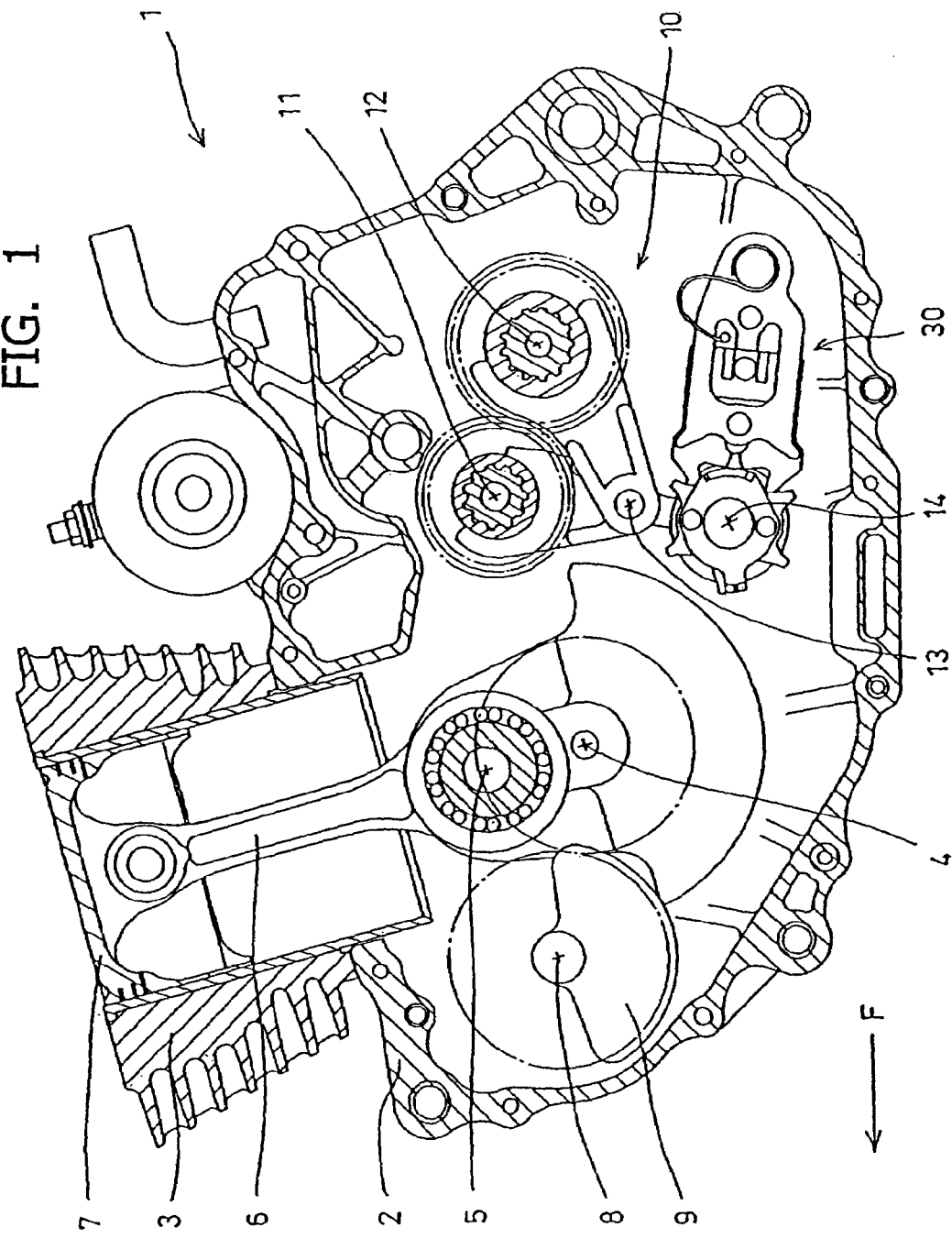
FIG. 1 is a longitudinal cross-sectional view of an internal combustion engine according to a selected illustrative embodiment of the present invention, showing the location and orientation of the shift drum and its turning mechanism within the crankcase.

It should be understood that only structures considered necessary for clarifying the present invention are described herein. Other conventional structures, and those of ancillary and auxiliary components of the system, are assumed to be known and understood by those skilled in the art. Referring now to the drawings, FIG. 1 is a longitudinal cross-sectional view of an internal combustion engine 1, as viewed from the left side and incorporating a shift position detector according to a selected illustrative embodiment of the present invention. The engine 1 of FIG. 1 can also be characterized as a power-train unit, since it incorporates a transmission internally therein, as well as conventional engine components. The engine 1 is intended for use in a motorcycle or other saddle-type vehicle. A directional arrow F in FIG. 1 indicates the front, or forward driving direction, of the vehicle. In the figure, a cylinder block 3 is joined to the upper portion of a crankcase 2. A cylinder head (not shown) and a cylinder head cover (not shown) are omitted from the figure for simplicity of illustration. A crankshaft 4 is provided in the front portion of the crankcase 2. A connecting rod 6 is connected, at its one end, to a crankpin 5 of the crankshaft 4. The other end of the connecting rod 6 is pivotally connected to a piston 7. The piston 7 performs reciprocal up-and-down motions within the cylinder block 3, resulting in the production of power. A balance shaft 8, gear-driven through the crankshaft 4, is provided forward of the crankshaft 4 and carries a balancer 9 thereon.

A manual transmission 10 is provided in the rear portion of the crankcase 2. The transmission 10 includes a main shaft 11, a countershaft 12, a shift fork shaft 13, and a shift drum 14. The main shaft 11 is drivingly rotated from the crankshaft 4, via gears and a multiple plate clutch. The countershaft 12 is rotationally driven from the main shaft 11 through speed-change gears. A shift drum turning mechanism 30 is located below the transmission 10.

Figure 2:
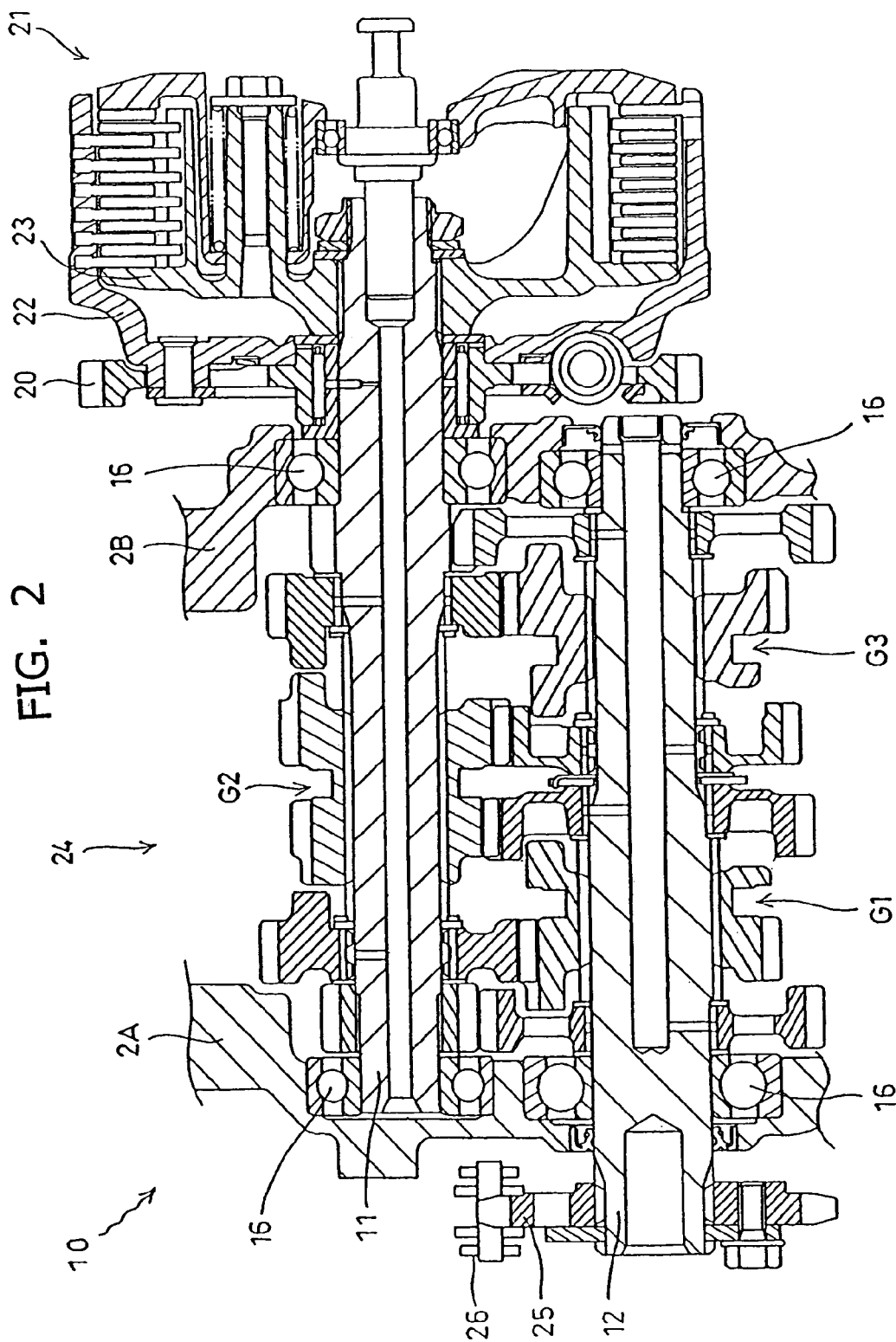
FIG. 2 is a transverse cross-sectional view of a main shaft and a countershaft of a gear transmission of the engine of FIG. 1, showing a clutch mounted on one end of the main shaft, and interaction between gears on the main shaft and the countershaft.

FIG. 2 is a transverse cross-sectional view of a portion of the engine 1, illustrating the main shaft 11 and countershaft 12 of the transmission 10. The main shaft 11 and the countershaft 12, respectively, are supported for rotation by a left-hand crankcase 2A and a right-hand crankcase 2B through bearings 16. A transmission input gear 20 is fitted to a portion near the right end of the main shaft 11. The transmission input gear 20 is in full-time engagement with an output gear (not shown) of the crankshaft 4, and is capable of circumferential rotation about the axis thereof. A multiple plate clutch 21 is provided at the right end of the main shaft 11. The multiple plate clutch 21 is normally engaged, but can be selectively disengaged when operated by an operation mechanism. A clutch outer portion 22 of the clutch 21 is secured to the transmission input gear 20, whereas a clutch inner portion 23 of the clutch 21 is secured to the main shaft 11. Rotation of the crankshaft 4 is transmitted to the transmission input gear 20 via a crankshaft output gear (not shown), and further transmitted to the main shaft 11 through the multiple plate clutch 21.

The main shaft 11 carries six gears. The countershaft 12 also carries six gears located at positions corresponding respectively to the six gears of the main shaft 11, so that one of the latter six gears may be full-time meshed with the corresponding one of the former six gears. The power transmission roles of first to fifth speeds and reverse are respectively assigned to the six pairs of gears constituting the group of gears 24. Incidentally, the pairing reverse gears are meshed with each other through an intermediate gear (not shown).

Figure 3:
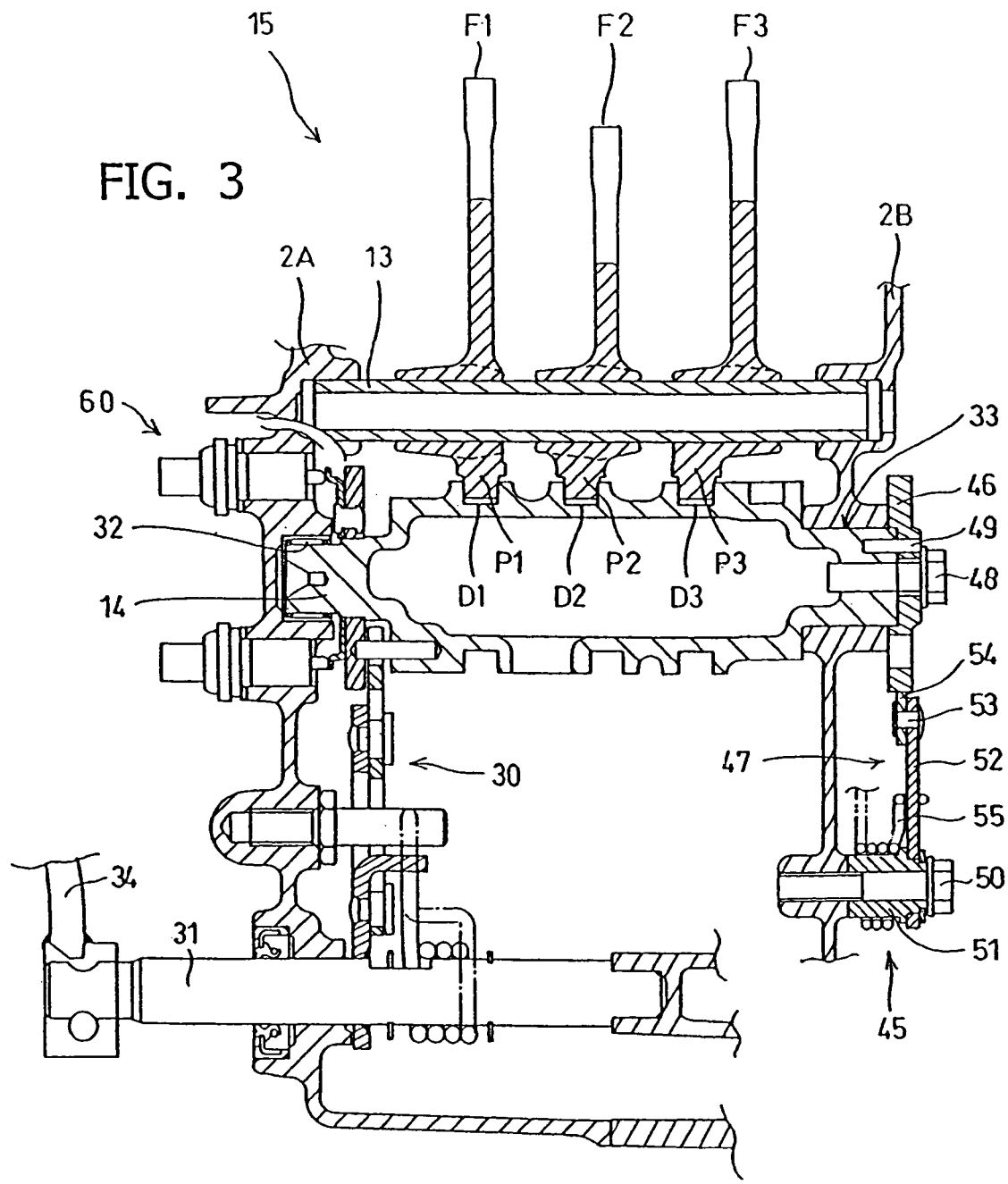
FIG. 3 is a transverse cross-sectional view of a gear change mechanism of the engine of FIG. 1, showing the neutral position detector and a reverse position detector disposed opposite to each other with respect to an axis of the shift drum.

FIG. 3 is a transverse cross-sectional view of a portion of the engine 1, showing a gear change mechanism 15, including the shift fork shaft 13, the shift drum 14 and a change spindle 31. The left and right ends of the shift fork shaft 13 are supported by the left-hand crankcase 2A and the right-hand crankcase 2B, respectively. The shift fork shaft 13 carries three shift forks F1, F2, F3, which are axially slidable thereon. The fork part of the first shift fork F1 is engaged with a groove G1 (FIG. 2) provided on an axially movable gear of the group of gears 24. The fork part of the second shift fork F2 is engaged with a groove G2, and the fork part of the third shift fork F3 is engaged with a groove G3, the grooves G2 and G3 also each provided on an axially movable gear of the group of gears 24.

The shift drum 14 is rotatably supported, at its left and right ends, by the left-hand and right-hand crankcases 2A and 2B via a needle bearing 32 and a plain bearing 33, respectively.

The shift drum 14 is provided with a first cam groove D1, a second cam groove D2 and a third cam groove D3. The sliding pin P1 of the first shift fork F1 is slidably engaged with the first cam groove D1, the sliding pin P2 of the second shift fork F2 is slidably engaged with the second cam groove D2, and the sliding pin P3 of the third shift fork F3 is slidably engaged with the third cam groove D3.

The change spindle 31 is rotatably supported by the right-hand and left-hand crankcases 2A and 2B. The shift drum turning mechanism 30 is located between the change spindle 31 and the shift drum 14. A gearshift position detector 60 is provided at the left end of the shift drum 14. The shift drum turning mechanism 30 is a mechanism for turning the shift drum 14 on a predetermined angle basis, in accordance with a turn of the change spindle 31. The turn of the change spindle 31 is achieved by a pressure applied onto a shift pedal (not shown), which is provided at the end of a shift pedal arm 34 welded to the left end of the change spindle 31.

Operation of the shift drum turning mechanism 30 turns the shift drum 14 by a predetermined amount, whereby the cam grooves work to move one of the first, second and third shift forks along the shift fork shaft. An axially movable gear in mesh with the shift fork comes into mesh with the rotatable gear adjacent thereto. Consequently, the pair of gears selected, as above, among the group of gears in mesh with each other, is coupled to the respective shaft. When the pair of gears is meshed, the gear change by the gear change mechanism 15 is effected. Thus, rotation is transmitted from the main shaft 11 to the countershaft 12 at a change gear ratio determined by the pair of meshed gears. A sprocket 25 (FIG. 2) is provided at the left end of the countershaft 12. A chain 26 (FIG. 2) is wound around the sprocket 25, to transmit the output of the gear transmission 10 to a rear wheel (not shown) for driving the vehicle.

Figure 4:
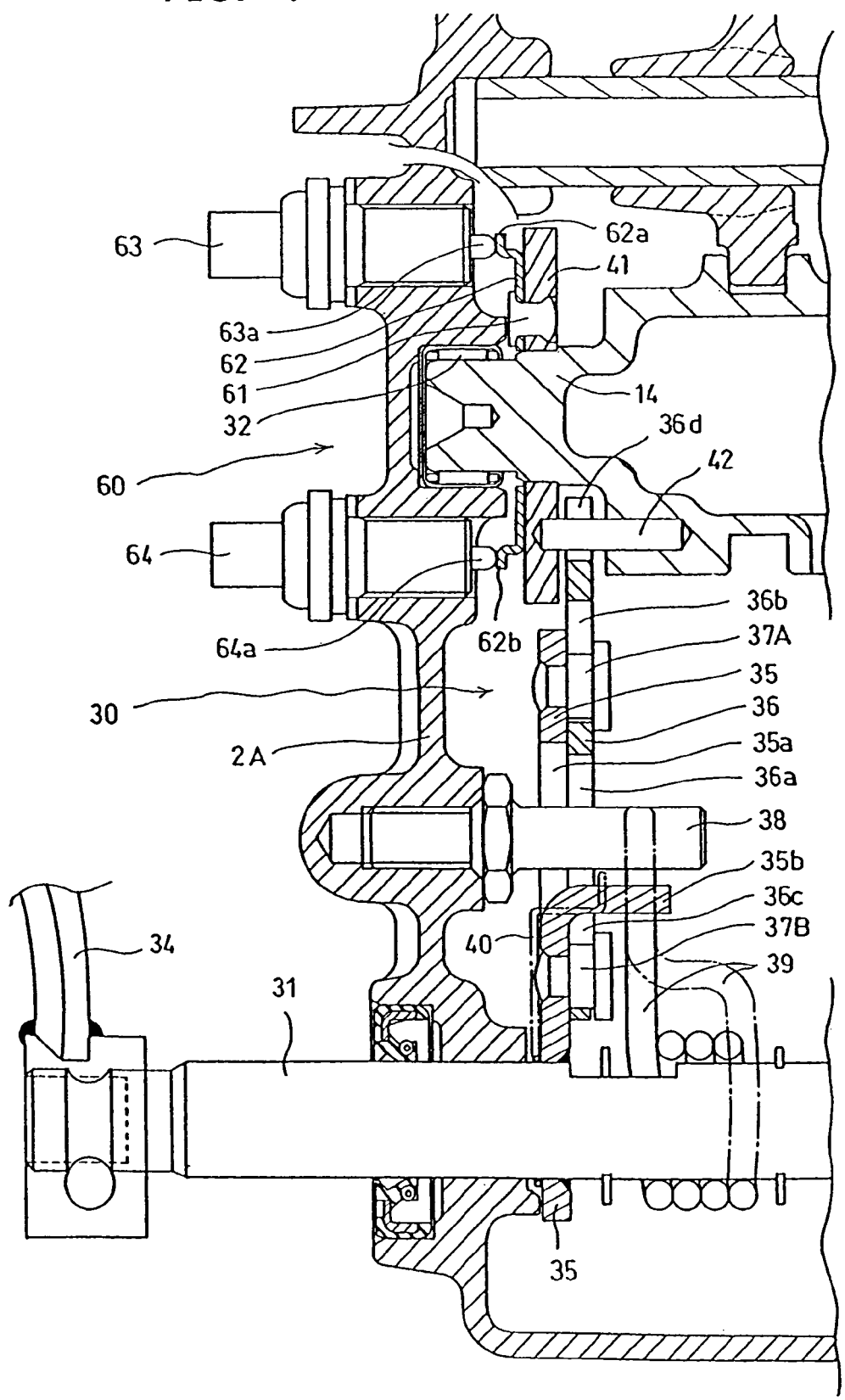
FIG. 4 is an enlarged cross-sectional view of a shift drum turning mechanism and a gearshift position detector of the engine of FIG. 1.
Figure 5:
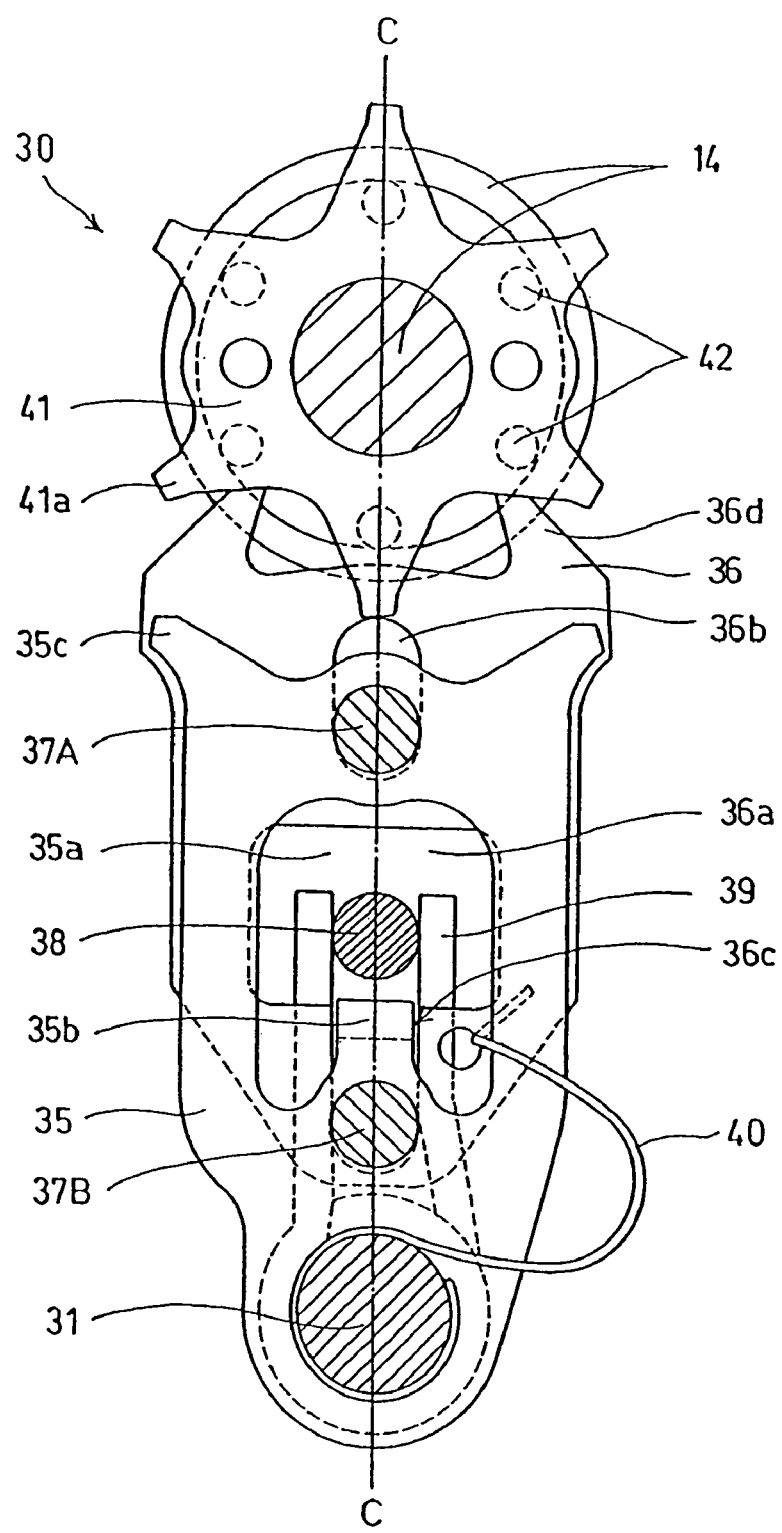
FIG. 5 is a side plan detail view, partially in cross-section, of the shift drum turning mechanism of FIG. 4 as viewed from the left side, showing the interaction between the change arm, the shifter plate, and the skip turn prevention plate.

FIG. 4 is an enlarged cross-sectional detail view of the shift drum turning mechanism 30 and the gearshift position detector 60. FIG. 5 is a side plan detail view of the shift drum turning mechanism 30, as viewed from the left side. A change arm 35 is fixedly welded to the change spindle 31 for turning therewith. A shifter plate 36 overlaps the change arm 35 and is carried on the change arm 35 with two guide pins 37A, 37B slidably with respect thereto.

The change arm 35 and the shifter plate 36 are each respectively provided with medial openings 35a and 36a, slightly different in shape from each other. The shifter plate 36 is slidable in the direction of a centerline C-C of the change arm 35, within a range defined by the longitudinal hole 36b of the shifter plate 36 and the cut-in portion 36c of the medial opening 36a. A guide pin 37A is inserted into the longitudinal hole 36b, whereas a guide pin 37B is inserted into the cut-in portion 36c. A restriction bolt 38 is provided which passes through the medial opening 35a of the change arm 35 and the medial opening 36a of the shifter plate 36. The proximal end of the restriction bolt 38 is threadably fixed to the left-hand crankcase 2A. The change arm 35 includes a spring-pressing portion 35b, extending transversely outwardly from the main plane of the change arm, on one side of the medial opening 35a thereof. The spring-pressing portion 35b is shaped to project in the direction of the central portion of the medial opening 35a, and then bend into the medial opening 36a of the shifter plate 36.

The change arm 35 is turned together with the change spindle 31. In order for the change arm 35 to return to its original position, a change arm return spring 39 is wound around the change spindle 31, in such a manner that the restriction bolt 38 and the spring-pressing portion 35b of the change arm 35 are put between both the ends of the spring 39.

As stated above, the shifter plate 36 is slidable with respect to the change arm 35. A shifter plate urging spring 40 is attached between the change spindle 31 and the shifter plate 36, so as to urge the shifter plate 36 in the direction of the shift drum 14. A skip-turn-prevention plate 41 is fixedly press-fitted onto an end of the shift drum 14. As described later, this plate 41 is a member for preventing the shift drum 14 from skip-turning in excess of one stage, for one shift operation. Six engagement rollers 42 are provided between the end of the shift drum 14 and the plate 41.

Referring to FIG. 5, when the change spindle 31 is turned by a shift pedal force, the change arm 35, welded to the change spindle 31, is turned together with the shifter plate 36, which is slidably attached to the change arm 35 via the guide pins 37A, 37B. One leg of the change arm return spring 39 is pressed and opened by the spring-pressing portion 35b of the change arm, whereas the other leg is not moved, because of being blocked by the restriction bolt 38. The shifter plate 36 is turned along with turning of the change arm 35, whereby one of a pair of right and left engagement projections 36d is brought into engagement with an engagement roller 42, turning the shift drum 14. As best seen in FIG. 5, the engagement projections 36d are projecting top ends of the shifter plate 36.

After the shift drum 14 is turned at a predetermined angle, the change arm 35 and the shifter plate 36 are returned to their original positions by the resilience of the change arm return spring 39. When the shift drum 14 is turned at the predetermined angle, another engagement roller, next to the engagement roller 42 that has been previously engaged with the engagement projections, occupies the position that has been previously occupied by the previously engaged engagement roller. Therefore, when returned, the engagement projections 36d of the shifter plate 36 have to override the engagement roller next to the engagement roller that has been previously engaged with the engagement projections. In this case, since the shifter plate 36, movable in the range of the longitudinal hole 36b, moves backward against the urging force of the shifter plate urging spring 40, the engagement projections 36 can override the next roller. If an excessive force is applied to the change arm 35, then the shift drum 14 is about to skip-turn over the predetermined angle. In this case, an external projection 41a of the skip-turn-prevention plate 41 comes into contact with a contact end 35c of the change arm 35, preventing the potential skip-turn from taking place.

Figure 6:
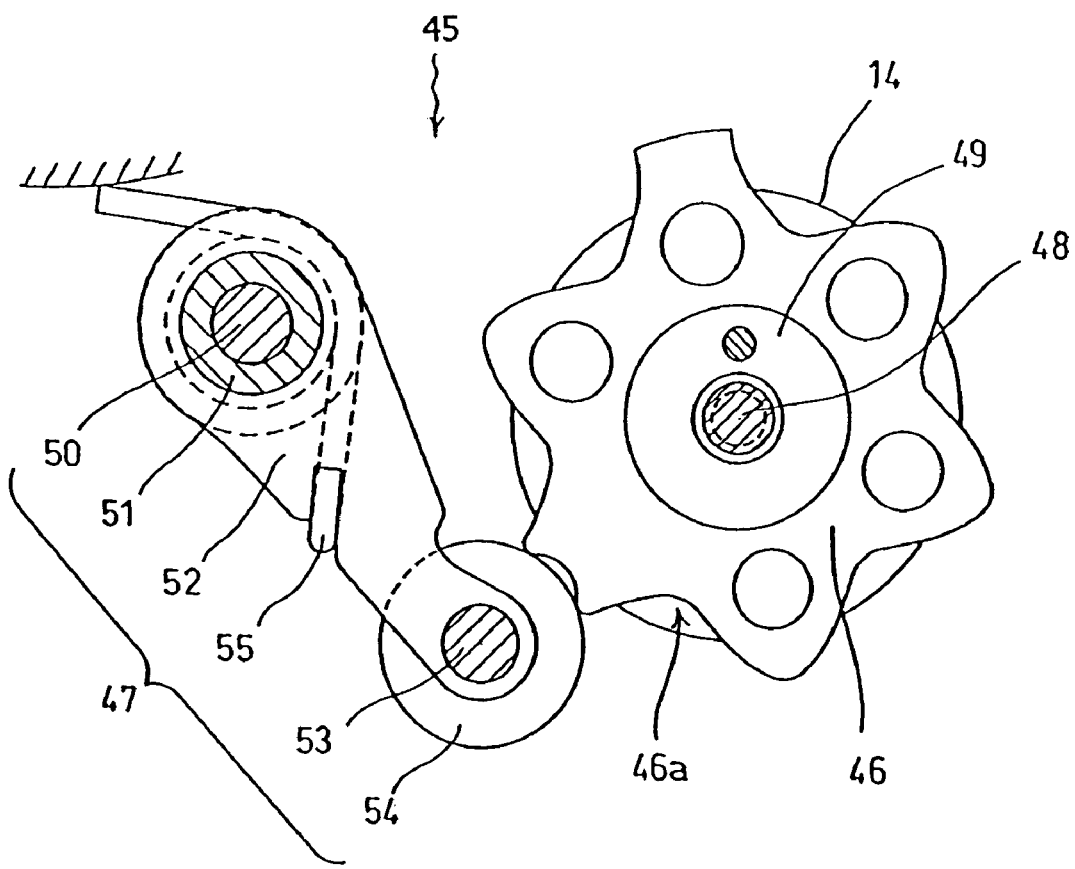
FIG. 6 is a side plan detail view, partially in cross-section, of a shift drum turning position stabilizer as viewed from the right side of the shift drum.

Referring to FIGS. 3 and 6, a shift drum stabilizer 45 is provided at the right end of the shift drum 14. FIG. 6 is a view of the stabilizer 45 as viewed from the right side of the shift drum 14. The stabilizer 45 includes a star-shaped plate 46, and a stopper roller assembly 47. The star-shaped plate 46 is secured to an end of the shift drum 14 with a mounting bolt 48 and a locking pin 49. The stopper roller assembly 47 includes a sleeve 51, an arm 52, a roller shaft 53, a stopper roller 54, and a spring 55. The sleeve 51 is secured to the right-hand crankcase 2B with a bolt 50. The arm 52 is held for turning around the sleeve 51. The stopper roller 54 is held at the free end of the arm 52, for turning around the roller shaft 53. The spring 55 is adapted to urge the arm 52 in the direction of the curved arrow in FIG. 6, so as to press the stopper roller 55 against the circumferential surface of the star-shaped plate 46. The turning positions of the shift drum 14, associated with the respective change gear ratios, are stably maintained by press-fitting the stopper roller 54 into one of the outer circumferential recesses 46a associated with the respective change gear ratios.

Figure 7:
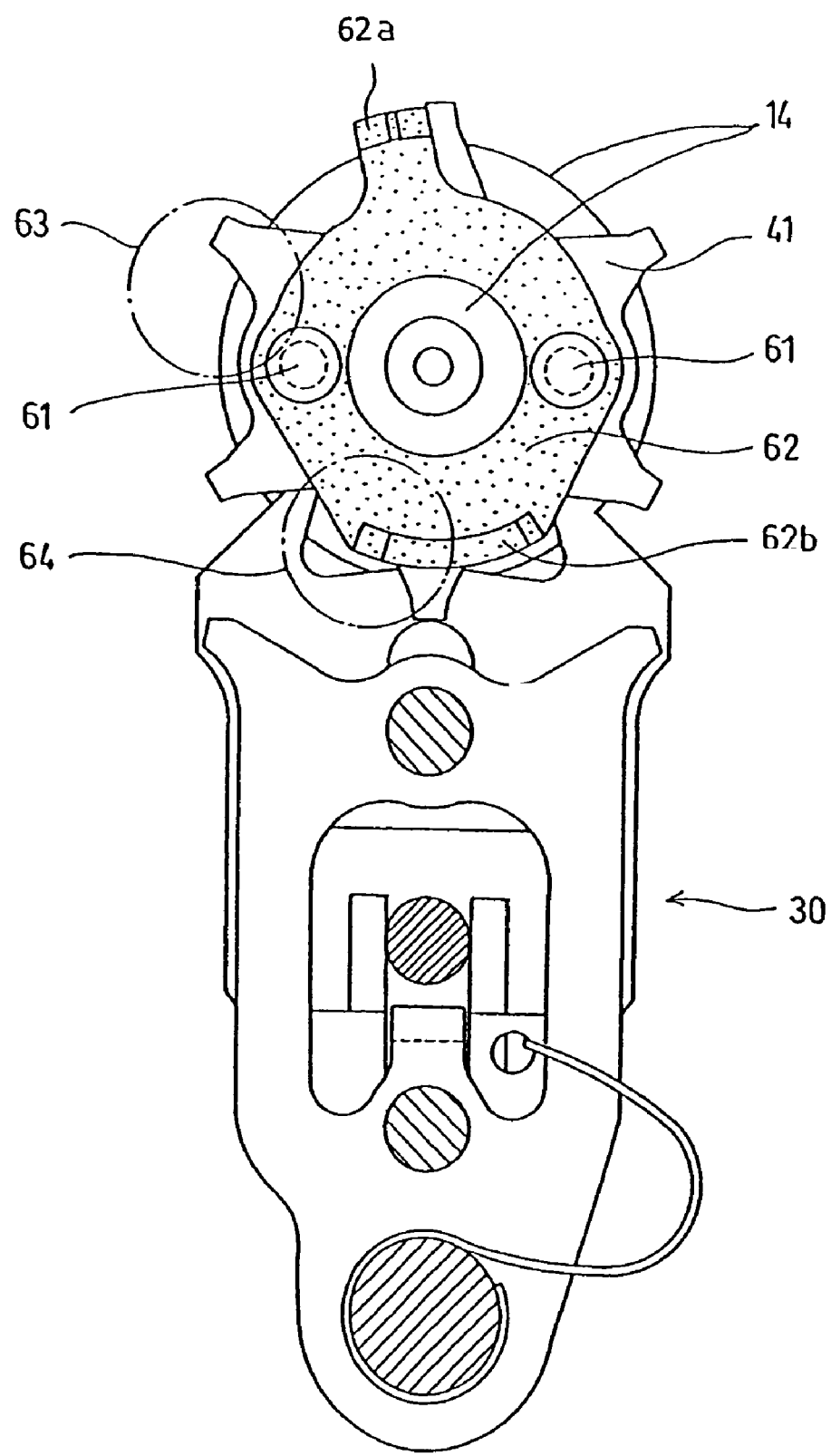
FIG. 7 is a side plan detail view, partially in cross-section, illustrating the gearshift position detector and the vicinity thereof as viewed from the left side of the shift drum.

Referring again to FIG. 4, the gearshift position detector 60 is located on the left side of the shift drum 14. FIG. 7 is a view illustrating the detector 60 and the vicinity thereof as viewed from the left side of the shift drum 14. The detector 60 is a device for detecting the turning positions of the shift drum 14, particularly when the transmission is in the neutral or reverse gear position. The detector 60 includes a switch plate 62, a neutral indicator switch 63, and a reverse indicator switch 64. The indicator switches 63, 64 may be arranged to switch on indicator lamps (not shown) on the user instrument panel, or alternatively, may generate audible signals to alert the user regarding the selected gear. As shown, the indicator switches 63, 64 are disposed separately and independently of each other.

The switch plate 62 is secured to the skip-turn-prevention plate 41 with two rivets 61. The switch plate 62 is fixedly swaged to the skip-turn-prevention plate 41 with the rivets 61 before the skip-turn-prevention plate 62 is attached to the shift drum 14. The combination of the switch plate 62 and the skip-turn-prevention plate 41 is fixedly press-fitted to the end of the shift drum 14. The switch plate 62, the skip-turn-prevention plate 41 and the shift drum 14 are turned in a unified manner, that is, at the same time. The neutral indicator switch 63 and the reverse indicator switch 64, respectively, are threadably secured to the left-hand crankcase 2A.

The switch plate 62 is a metal plate, and is provided, at opposite ends thereof, with a neutral switch actuator arm 62a and a reverse switch actuator arm 62b. The actuator arms 62a and 62b are formed extending outwardly, like a cam, by deforming the ends of the metal plate so that the respective contact potions are slightly extended with respect to the middle plane portion of the metal plate (see FIG. 4). On the other hand, the indicator switches 63, 64 are each respectively provided with a movable contact 63a, 64a, at their respective inwardly-facing terminal ends (FIG. 4). When the movable contacts 63a, 64a come into contact with the actuator arms 62a, 62b of the switch plate 62, respectively, the movable contacts are pressed slightly inwardly, which turns on the switch for energization, thus achieving detection of the shift positions. The energization from the switch lights a lamp (not shown) located at the mid portion of a steering handlebar in front of an operator. This informs the operator of the neutral state or of the reverse state, at that time.

Incidentally, in FIGS. 4 and 7, the radial distance from the center of turning of the shift drum to the neutral indicator switch 63, or the neutral switch actuator arm 62a, differs from that to the reverse indicator switch 64 or the reverse switch actuator arm 62b. Therefore, only the corresponding contact therebetween will be established. In other words, the neutral switch actuator arm can only activate the neutral indicator switch, and the reverse switch actuator arm can only activate the reverse indicator switch, because of the different radial distances of the respective switches, and the corresponding actuator arms, from the axis of the shift drum.

As described in detail above, in the present embodiment, since the switch plate 62 is attached to skip-turn-prevention plate 41 in a unified manner, the length of time required for attachment is reduced, attachment accuracy is improved and space-saving can be achieved.

While a working example of the present invention has been described above, the present invention is not limited to the working example described above, but various design alterations may be carried out without departing from the present invention as set forth in the claims. Those skilled in the art will realize that many modifications of the preferred embodiment could be made which would be operable. All such modifications, which are within the scope of the claims, are intended to be within the scope and spirit of the present invention.

What is claimed is:

1. A gearshift position detector for a vehicle powertrain unit,
the powertrain unit comprising a crankcase and a crankcase cover, the powertrain unit further comprising a transmission housed within the crankcase, wherein a neutral indicator switch and a reverse indicator switch are affixed to the crankcase or to the crankcase cover,
the transmission comprising:
a shift drum,
a skip-turn-prevention plate secured to an end of the shift drum, and
an actuator member directly attached to the skip-turn-prevention plate,
wherein the actuator member is adapted to selectively engage said indicator switches to indicate a neutral position or a reverse position of the transmission,
wherein the neutral indicator switch and the reverse indicator switch are each provided with a movable contact portion and situated so as to be activatable by contact with a corresponding portion of the actuator member; and
wherein the actuator member comprises a neutral switch actuator arm and a reverse switch actuator arm, and wherein the neutral switch actuator arm and the reverse switch actuator arm are disposed on opposite sides of the shift drum.

2. The gearshift position detector according to claim 1, wherein the neutral switch actuator arm is configured to contact only the neutral indicator switch, and wherein the reverse switch actuator arm is configured to contact only the reverse indicator switch.

3. The gearshift position detector according to claim 1, wherein the skip-turn-prevention plate is secured to an end portion of the shift drum in circumferentially surrounding relation thereto, and wherein the indicator switches each have a longitudinal axis which is substantially parallel to a longitudinal axis of the shift drum.

4. The gearshift position detector according to claim 1, wherein the actuator member comprises a plate having peripheral edge portions extending outwardly, such that the peripheral edge portions are displaced outwardly from a middle plane portion of the plate, to form said neutral switch actuator arm and said reverse switch actuator arm, respectively, and such that the indicator switches are selectively energizable by contact with one of said corresponding switch actuator arm.

5. The gearshift position detector according to claim 1, wherein the actuator member comprises a plate having a first peripheral edge portion displaced in a longitudinal direction of the shift drum from a middle plane portion of the plate to form said neutral switch actuator arm, and the actuator member has a second peripheral edge portion displaced in the longitudinal direction of the shift drum from the middle plane portion of the plate to form said reverse switch actuator arm;
wherein the neutral indicator switch is energizable when contacted by the neutral switch actuator arm, the reverse indicator switch is energizable when contacted by the reverse switch actuator arm, and
wherein a radial distance from a longitudinal axis of the shift drum to the neutral switch actuator arm differs from a radial distance from the longitudinal axis of the shift drum to the reverse switch actuator arm.

6. The gearshift position detector according to claim 1, wherein the actuator member is disposed around a longitudinal end portion of the switch drum in circumferentially surrounding relation thereto.

7. The gearshift position detector according to claim 1, wherein the neutral indicator switch is disposed separately and independently from the reverse indicator switch.

8. The gearshift position detector according to claim 1, wherein the neutral indicator switch and reverse indicator switch extend through openings provided in the crankcase or the crankcase cover.

9. A gearshift position detector for a transmission of a vehicle,
the transmission comprising:
a hollow case,
a neutral indicator switch and a reverse indicator switch mounted to the hollow case adjacent to an actuator member,
a shift drum having a longitudinal axis, and
a skip-turn-prevention plate secured to an end portion of the shift drum in circumferentially surrounding relation thereto,
wherein the actuator member is directly attached to the shift drum skip-turn-prevention plate,
wherein the actuator member selectively engages said indicator switches to indicate a neutral position and a reverse position of the transmission,
wherein the neutral indicator switch and the reverse indicator switch are selectively activated when engaged by the actuator member;
wherein the actuator member comprises a neutral switch actuator arm and a reverse switch actuator arm; and
wherein said neutral switch actuator arm and said reverse switch actuator arm are disposed substantially on opposite sides of the shift drum.

10. The gearshift position detector according to claim 9, wherein said switch actuator arms are disposed substantially on opposite sides of the shift drum longitudinal axis.

11. The gearshift position detector according to claim 9, wherein the neutral switch actuator arm is positioned to contact only the neutral indicator switch, and the reverse switch actuator arm is positioned to contact only the reverse indicator switch.

12. The gearshift position detector according to claim 9, wherein the indicator switches each have a longitudinal axis which is substantially parallel to the longitudinal axis of the shift drum.

13. The gearshift position detector according to claim 9, wherein the actuator member comprises a plate having peripheral edge portions extending outwardly, such that the peripheral edge portions are displaced in a longitudinal direction of the shift drum from a middle plane portion of the plate, to form said neutral switch actuator arm and said reverse switch actuator arm, respectively, and such that the indicator switches are selectively energizable by contact with the neutral switch actuator arm or the reverse switch actuator arm.

14. The gearshift position detector according to claim 9, wherein the actuator member is disposed around the end portion of the shift drum in circumferentially surrounding relation thereto.

15. The gearshift position detector according to claim 9, wherein the neutral indicator switch is disposed separately and independently from the reverse indicator switch.

16. The gearshift position detector according to claim 9, wherein the neutral indicator switch and reverse indicator switch extend through openings provided in the crankcase or the crankcase cover.

17. The gearshift position detector according to claim 9,
wherein the actuator member comprises a plate having a first peripheral edge portion displaced in a longitudinal direction of the shift drum from a middle plane portion of the plate to form said neutral switch actuator arm, and the actuator member has a second peripheral edge portion displaced in the longitudinal direction of the shift drum from the middle plane portion of the plate to form said reverse switch actuator arm;

wherein the neutral indicator switch is energizable when contacted by the neutral switch actuator arm, the reverse indicator switch is energizable when contacted by the reverse switch actuator arm, and wherein a radial distance between the longitudinal axis of the shift drum and the neutral switch actuator arm differs from a radial distance between the longitudinal axis of the shift drum and the reverse switch actuator arm.

18. The gearshift position detector according to claim 17, wherein said switch actuator arms are disposed substantially on opposite sides of the shift drum longitudinal axis.

* * * * *